United States Patent [19]

Markhart

[11] Patent Number: 4,542,992

[45] Date of Patent: Sep. 24, 1985

[54] CONTINUOUS MIXER

[75] Inventor: Gary T. Markhart, Hamden, Conn.

[73] Assignee: USM Corporation, Farmington, Conn.

[21] Appl. No.: 661,590

[22] Filed: Oct. 17, 1984

[51] Int. Cl.$^4$ ............................................. B01F 7/08
[52] U.S. Cl. ..................................... 366/300; 366/84; 425/204
[58] Field of Search .................... 366/83, 84, 85, 297, 366/298, 299, 300, 301, 66; 425/200, 376 R, 96, 204, 209

[56] References Cited

U.S. PATENT DOCUMENTS

| | | | |
|---|---|---|---|
| 3,154,808 | 11/1964 | Ahlefeld | 366/77 |
| 3,239,878 | 3/1966 | Ahlefeld | 366/77 |
| 3,468,518 | 9/1969 | Koch | 425/200 |
| 3,561,046 | 2/1971 | Comes | 425/200 |
| 3,704,866 | 12/1972 | Mosher | 366/80 |
| 4,053,144 | 10/1977 | Ellwood | 366/97 |
| 4,184,773 | 1/1980 | Ellwood | 366/91 |
| 4,380,397 | 4/1983 | Hashizume | 366/84 |

Primary Examiner—Robert W. Jenkins
Attorney, Agent, or Firm—Aubrey C. Brine

[57] ABSTRACT

Apparatus for mixing powdered and liquid materials to form slurries comprising a mixer body having an inlet for such materials and parallel mixing chambers extending to a discharge outlet. Rotors are mounted for rotation in the chambers and include feed sections leading from the inlet to mixing sections and to the outlet. The mixing section of each rotor includes a first lobed mixing portion having short advancing helices, and reverse helices adapted to quickly wet and pressurize the mixture to force entrapped air back through inlet. The mixing section also has a second mixing portion having an increased number of lobes following the first portion to increase the mixing action and shear on the mixture. The second mixing section is followed by a lobed discharge section adapted to impel the mixture through the outlet.

5 Claims, 4 Drawing Figures

CONTINUOUS MIXER

FIELD OF THE INVENTION

This invention relates to apparatus for mixing solids and liquids.

DESCRIPTION OF THE PRIOR ART

In the past powders and liquids, in particular powdered coal and water, have been mixed by using turbine blade mixers. The main disadvantage, of such devices, particularly in mixing powdered coal and water into slurries which may be atomized for combustion have included low production rates, high energy consumption and air entrapment. The necessary mixing action must uniformly disperse the ingredients which is generally measured by measuring the viscosity of the mixture. It was found that viscosity was adversely affected by entrapped air or other gases.

Mixing apparatus currently available are typically shown in U.S. Pat. Nos. 3,154,808, 3,239,878, 3,561,046 and 3,704,866. These patents describe the Farrel Continuous Mixer well known for mixing substantially stiff rubber and plastic materials. Such machines failed to mix the coal powder and water ingredients to a desired viscosity even when the machine was modified from a standard length to a double length of seven times the diameter of the rotors (7/1 L/D).

Accordingly, it is a general object of the invention to provide a novel mixing apparatus which thoroughly disperses powdered and liquid materials and minimizes entrapped gas such as air in the coal water slurry without loss of through put rate and with improved mixing of the materials.

SUMMARY OF THE INVENTION

There is provided apparatus including a mixer body having side-by-side parallel chambers, a common inlet, connected mixing sections and a common outlet. Elongated rotors are mounted for rotation in the chambers and include screw like feed sections communicating with the inlet, mixing sections, and discharge sections communicating with the outlet. The mixing sections of the rotors each comprise a first lobed mixing portion adapted to pressurize the mixture early, forcing entrapped air back out the inlet and a second mixing portion having an increased number of lobes to increase the high shear mixing action on the slurry mixture for improved dispersion of the materials.

DESCRIPTION OF THE PREFERRED EMBODIMENT

Figure 3:
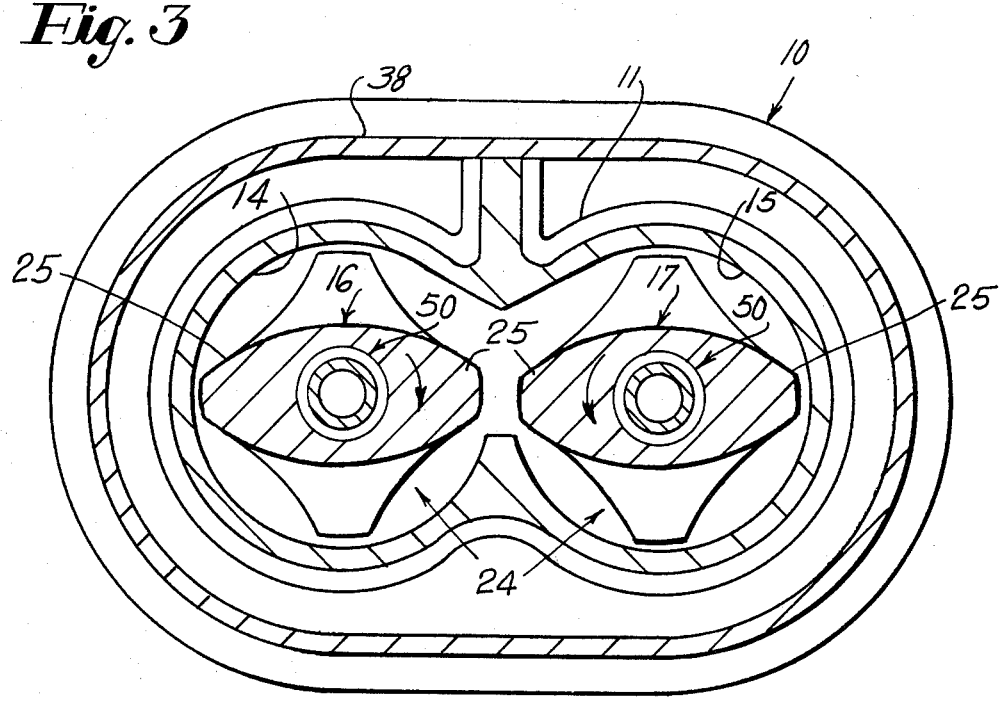
FIG. 3 is a cross-section taken substantially on line III—III of FIG. 2.
Figure 4:
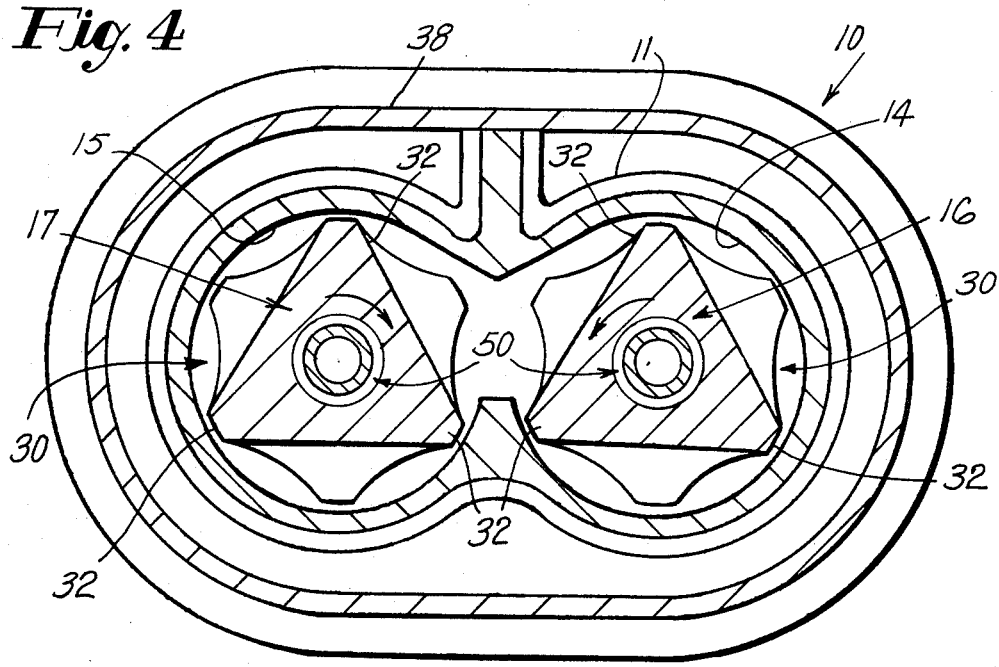
FIG. 4 is a cross-section taken substantially on line IV—IV of FIG. 2.

Referring to the drawings there is shown a continuous type of mixing apparatus 10 having a body 11 provided at one end with an inlet 12 receiving the lower end of a hopper 13 for ingredients to be mixed. The inlet communicates with a pair of laterally connected parallel chambers 14, 15 in the body in which are mounted a pair of rotors 16, 17 driven in rotation by means (not shown) such as one or more electric or hydraulic motors. The rotors are suitably connected such as by gearing (not shown) for equal and opposite rotation. At the opposite end, the body is provided with a discharge outlet 18. The rotors are provided with lobes 25 and 32 which are arranged to rotate tip-to-tip as seen in FIGS. 3 and 4.

Figure 1:
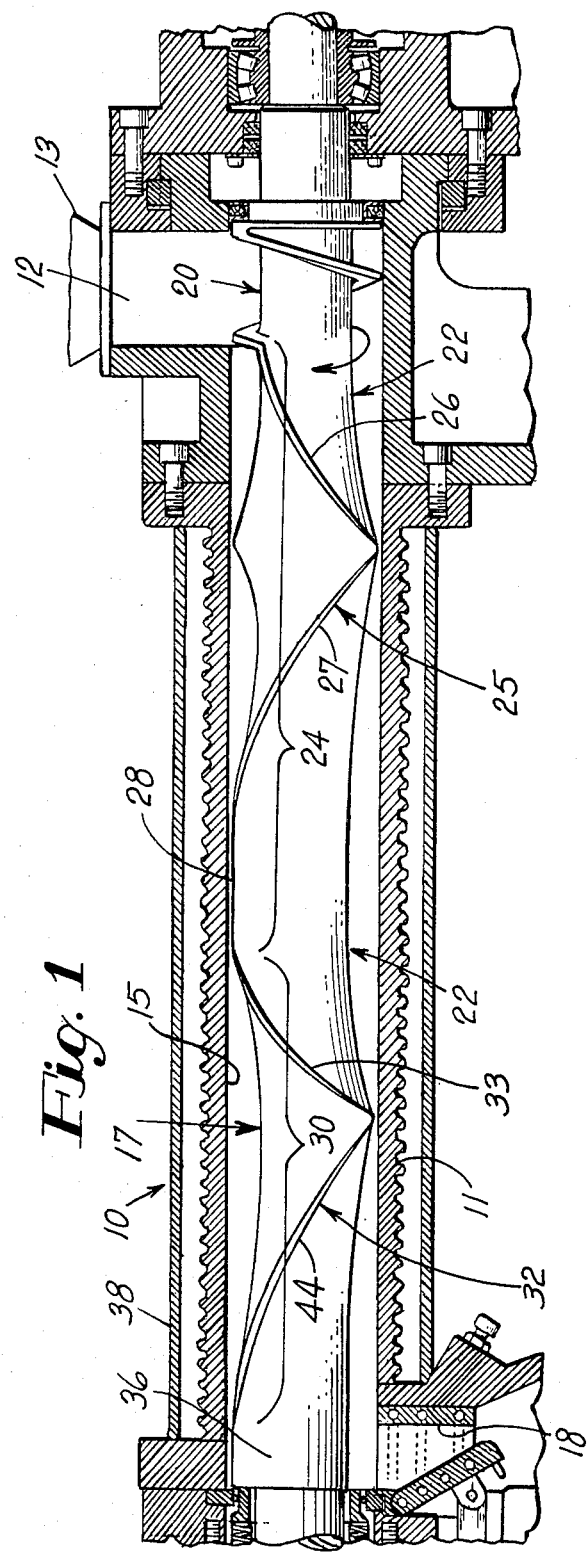
FIG. 1 is a longitudinal vertical sectional view taken substantially on line I—I of FIG. 2 through one chamber of a mixing machine embodying the invention.
Figure 2:
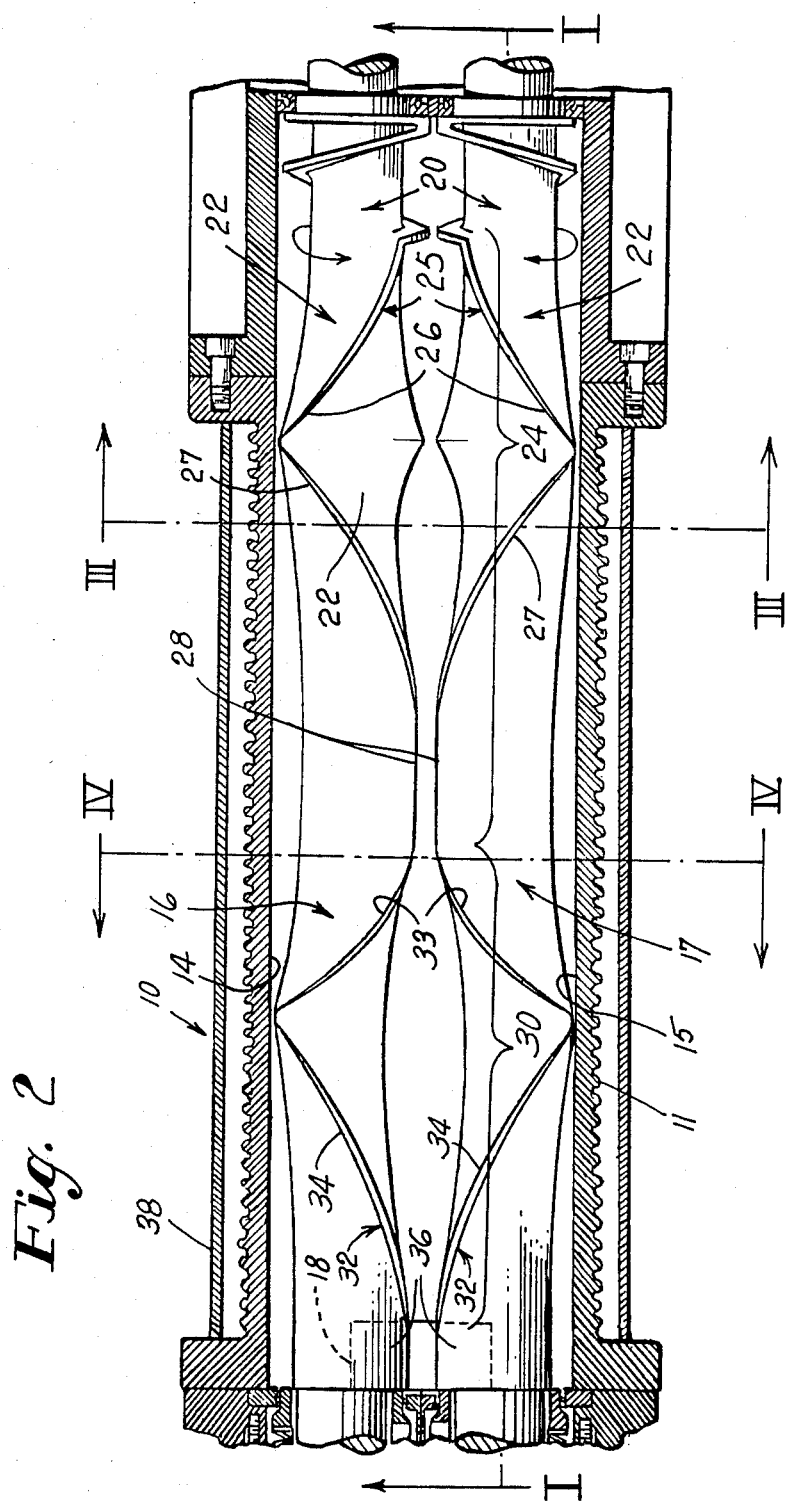
FIG. 2 is a plan sectional view through adjacent parallel mixing chambers.

At one end, each rotor has a screw-like section 20 which conducts material to be mixed fed through the inlet 12 from the hopper 13 to a mixing section 22. The mixing section includes a first mixing portion 24 comprising a pair of lobes 25 (FIG. 3) which have first short helices 26 (FIGS. 1 and 2) arranged to advance the materials fed by the feed section 20 axially a short distance toward the outlet until met by second longer reverse helices 27 followed by straight sections 28. It should be apparent that, while preferred, the straight sections 28 could be omitted without departing from the scope of the invention. The materials such as powdered coal and water thus are partially mixed and wetted and quickly pressurized in the first mixing portion so as to pressurize the wetted material enough to drive entrapped air back through the inlet. Following the straight sections 28, the lobes 25 merge into a second mixing portion 30 comprising an increased number of equally spaced lobes 32 shown in FIG. 4 as a delta shape. The lobes of portion 30 have short advancing helices 33 (FIG. 2) followed by longer reversing helices 34. The lobes of both portions are arranged in tip to tip orientation as seen in FIGS. 3 and 4 and with the increased number of lobes in portion 30, the material is exposed to increased shearing and mixing. Since the chambers are interconnected as seen in FIGS. 3 and 4, the material is forced back and forth between chambers.

As is common in such machines the mixed material is forced out of the outlet 18 at the same rate as fed into the chambers by the feed sections 20. To aid in the discharge of the mixed materials, the second mixing portions of the rotors are merged into straight sections 36 which impel the material through the outlet.

It should be apparent that a greater number of lobes may be provided in the portions 24 and 30 without departing from the scope of the invention. Such increased numbers of lobes and the variety of cross-sectional shapes available for use typically are shown in U.S. Pat. Nos. 4,053,144 and 4,184,773. Also, the temperature of the mixing sections may be varied with the use of temperature control fluid circulated through jackets 38 and through passages 50 in the rotors. As shown in U.S. Pat. No. 3,704,866 the top of the body of the mixer may be provided with replaceable inserts to vary the shape of the chambers as well as to provide ports through which further liquid materials may be added.

EXAMPLE I

A Farrel Continuous Mixer having mixing chamber diameters of 4 inches (13 CM) with a mixing section of 7/1 ratio or 28 inches long (118 CM) was used in the test. This machine used is known as a No. 4 Farrel Continuous Mixer (4 FCM) but with a mixing section double the standard size and manufactured by Farrel Division of USM Corporation. The rate of materials processed was about 1250 pounds per hour with the rotors having standard (#7 lobe) configuration cross sections but double the standard length in the mixing section being driven at the rate of 1000 RPM. The materials being mixed were utility grade ground coal and water with additives such as stabilizers and surfactants. The test resulted in a coal/water slurry having a viscosity of about 20,000 cps when a viscosity of around 5,000 cps is desired and necessary for atomization of the slurry sufficient for combustion.

EXAMPLE II

The same 4 FCM mixer body was used in the next test but the rotors of the present invention were installed. The rotors used were provided with a mixing section of the same diameter and length as above but having a first portion having a pair of diametrically opposite lobes arranged in short advancing helices followed by longer reversed helices which merged into straight sections. The mixing section also had a second portion having an increased number of lobes, i.e. three lobes arranged in a delta pattern. This arrangement quickly wetted and pressurized the partially mixed ingredients in the first portion enough to drive entrapped gases such as air back through the inlet. The increased number of lobes then mixed the degassed mixture with greater intensity and shear. The production rate was the same (1250 pounds per hour) with the same rotor speed (1000 RPM). It was found that the viscosity of the mixture was reduced to an acceptable level of 5600 cps and the additives necessary to enhance mixing and dispersion was reduced by 50% over previously used batch systems and 40% less than the equipment described in Example I.

It was apparent from the tests of the above Examples, that the new rotors of the invention used in Example II made a tremendous difference in the quality of coal/water slurry produced. While in usual procedures there is an optimum set of operating parameters for any given material mixed, test results showed that when the rotor RPM was increased the viscosity of the mixture was reduced. Even more impressive was the ability of the equipment of the invention to use less additives than with previous equipment of the prior art. The reduction achieved is substantial when considering the expensive nature of the additives used. Two methods of introducing additives are available for use and involve adding powdered additives in the inlet hopper or with the use of proper pumping devices to add such material as a liquid downstream of the first mixing portion of the rotors.

The invention has been described in a general way and it should be obvious that a variety of materials may be mixed and that various substitutions of elements and combinations of parts may be made without departing from the scope of the invention defined by the following claims.

I claim:

1. Mixing apparatus comprising a body having an inlet opening for admitting materials to be mixed into one end of a pair of parallel cylindrical chambers and having an outlet opening at the opposite end of the chambers for discharging material mixed in the chambers, and elongate rotors mounted for rotation in the chambers; each rotor having a screw-like feed section communicating with the inlet opening, a lobed section for mixing the material fed by the feed section and a discharge section communicating with the outlet; the mixing section of each rotor having a first mixing portion comprising lobes equally spaced about the rotor and extending helically to advance the material a short distance until the helices of the lobes are reversed a longer distance whereby the material is pressurized to force trapped gases back toward the inlet, the first mixing portion of the lobes being followed by a second mixing portion having an increased number of lobes equally spaced about the rotor and arranged in a short section of advancing helices followed by a longer section of reversed helices for increasing the mixing and shearing action on the material, the second portion of the mixing section being merged into a final straight lobed discharge section for impelling the mixed material through the discharge outlet.

2. Apparatus according to claim 1 in which the cylindrical chambers are connected along adjacent sides so material being moved can be passed between the chambers by the action of the rotors.

3. Apparatus according to claim 1 in which the rotors are counter rotated at the same speed with tip-to-tip orientation of the lobes.

4. Apparatus according to claim 1 in which the first portion of the mixing section includes a pair of diametrically opposite lobes and the second mixing portion is delta shaped.

5. Apparatus according to claim 1 in which the first mixing portion is followed by a straight section of the lobes.

* * * * *